(12) United States Patent
MacLennan et al.

(10) Patent No.: US 7,593,927 B2
(45) Date of Patent: Sep. 22, 2009

(54) UNSTRUCTURED DATA IN A MINING MODEL LANGUAGE

(75) Inventors: C. James MacLennan, Redmond, WA (US); Ioan Bogdan Crivat, Redmond, WA (US); ZhaoHui Tang, Bellevue, WA (US); Raman S. Iyer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 11/373,319

(22) Filed: Mar. 10, 2006

(65) Prior Publication Data

US 2007/0214164 A1    Sep. 13, 2007

(51) Int. Cl.
G06F 7/00    (2006.01)
G06F 17/30   (2006.01)
(52) U.S. Cl. .......................................... 707/3
(58) Field of Classification Search ........................ None
See application file for complete search history.

(56) References Cited

U.S. PATENT DOCUMENTS

| | | | |
|---|---|---|---|
| 6,567,814 B1 * | 5/2003 | Bankier et al. .............. | 707/101 |
| 6,847,955 B2 | 1/2005 | Aggarwal | |
| 2002/0152208 A1 | 10/2002 | Bloedorn | |
| 2003/0115080 A1 | 6/2003 | Kasravi et al. | |
| 2003/0120514 A1 | 6/2003 | Rao et al. | |
| 2003/0130878 A1 | 7/2003 | Kruk et al. | |
| 2004/0024720 A1 | 2/2004 | Fairweather | |
| 2004/0103116 A1 | 5/2004 | Palanisamy et al. | |
| 2004/0186826 A1 * | 9/2004 | Choi et al. ...................... | 707/3 |
| 2005/0108211 A1 * | 5/2005 | Karimisetty et al. ........... | 707/3 |
| 2005/0108256 A1 | 5/2005 | Wakefield et al. | |
| 2005/0234973 A1 | 10/2005 | Zeng et al. | |
| 2005/0267911 A1 | 12/2005 | Kamath et al. | |
| 2006/0206306 A1 * | 9/2006 | Cao et al. ....................... | 704/4 |
| 2006/0265253 A1 * | 11/2006 | Rao et al. ....................... | 705/3 |

OTHER PUBLICATIONS

ORACLE1, Oracle® Data Mining, "Application Developer's Guide, 10g Release 2 (10.2) B14340-01", Jun. 2005.*
ORACLE2, Oracle® Data Mining, "Concepts, 10g Release 2 (10.2) B14339-01," Jun. 2005.*
"Predictive Text Analytics," SPSS.com, (2 Pages).
Loughran, K., et al.; "GEDDM: Grid Based Conversion of Unstructured Data using a Common Semantic Model," (4 pages).
"SAS Raises Bar On Data Mining And Text Mining; Improves Predictive Analytics," Aug. 23, 2005 (3 pages).
Schuetze, H; "An Introductory Guide to Mining Text Data," DM Direct Newsletter, Sep. 26, 2003; (5 pages).

* cited by examiner

*Primary Examiner*—John E Breene
*Assistant Examiner*—Aleksandr Kerzhner
(74) *Attorney, Agent, or Firm*—Workman Nydegger (57) ABSTRACT

A standard mechanism for directly accessing unstructured data types (e.g., image, audio, video, gene sequencing and text data) in accordance with data mining operations is provided. The subject innovation can enable access to unstructured data directly from within the data mining engine or tool. Accordingly, the innovation enables multiple vendors to provide algorithms for mining unstructured data on a data mining platform (e.g., an SQL-brand server), thereby increasing adoption. As well, the subject innovation allows users to directly mine unstructured data that is not fixed-length, without pre-processing and tokenizing the data external to the data mining engine. In accordance therewith, the innovation can provide a mechanism to expand declarative language content types to include an "unstructured" data type thereby enabling a user and/or application to affirmatively designate mining data as an unstructured type.

20 Claims, 7 Drawing Sheets

UNSTRUCTURED DATA IN A MINING MODEL LANGUAGE

BACKGROUND

Computers and computer-based devices have become a necessary tool for many applications throughout the world. Typewriters and slide rules have become obsolete in light of keyboards coupled with sophisticated word-processing applications and calculators that include advanced mathematical functions/capabilities. Thus, trending applications, analysis applications, and other applications that previously may have required a collection of mathematicians or other high-priced specialists to painstakingly complete by hand can now be accomplished through use of computer technology. For instance, due to ever-increasing processor and memory capabilities, if data is entered properly into an application/wizard, such application/wizard can automatically output a response nearly instantaneously (in comparison to hours or days generating such response by hand previously required).

Furthermore, through utilization of computers and computer-related devices, vast magnitudes of data can be obtained for analysis and predictive purposes. For example, a retail sales establishment can employ a data analysis application to track sales of a particular good given a particular type of customer, income level of customers, a time of year, advertising strategy, and the like. More particularly, patterns within collected structured data can be determined and analyzed, and predictions relating to future events can be generated based upon these patterns. While the above example describes utilizing data in connection with retail sales, it is understood that various applications and contexts can benefit from analysis of accumulated data.

The aforementioned analysis of data, recognition of patterns, and generation of predictions based at least in part upon the recognized patterns can be collectively referred to as data mining. Conventionally, to enable suitable data mining, various models must be programmed and trained by way of training data. For instance, data previously collected can be employed as training data for one or more data mining models. The data mining models can employ various decision tree structures to assist in generating predictions, and can further utilize suitable clustering algorithms to cluster data analyzed by the data mining models. Accordingly, these data mining models can be extremely complex and require significant programming from an expert computer programmer.

Due to complexity of data mining models and extensiveness of computations utilized in connection with such data mining models, there currently exist various deficiencies associated therewith. For example, conventional systems are primarily directed to mining structured (e.g., relational) data. However, unstructured data is oftentimes available in the form of text documents, for example, related to Internet web pages and the like. Similarly, unstructured data can refer to image data as well as streaming audio and/or video. Today, developments in the field of mining unstructured data require extensive pre-processing and/or tokenizing of the data external to the data mining tool.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a standard mechanism for accessing and processing of unstructured data types in data mining. More particularly, the subject innovation enables access to unstructured data directly from within the data mining engine or tool. Accordingly, in one particular aspect, the innovation enables multiple vendors to provide algorithms for mining unstructured data (e.g., image, audio, video, gene sequencing and text data) on a data mining platform (e.g., an SQL-brand server data mining platform), thereby increasing adoption.

In another aspect of the subject innovation, the invention allows users to directly mine unstructured data (e.g., including image, audio, video, gene sequencing and text data) that are not fixed-length, without pre-processing and tokenizing the data outside the data mining engine. In accordance therewith, the innovation can provide a mechanism to expand declarative language content types to include an "unstructured" data type thereby enabling a user and/or application to affirmatively designate mining data as an "unstructured" type.

In another aspect, a receiving component and an unstructured data processing component can be employed to receive and process the declarative language syntax respectively. The unstructured data processing component can facilitate extracting key portions of the unstructured data, analyzing the extracted portions and converting the extracted portions into a format recognizable to a mining algorithm.

In still other aspects, the invention can include syntax for building mining models on unstructured data types. More particularly, the syntax can be an extension to both the DMX language and as well the XML DDL that can be used for defining data mining objects. More particularly, the syntax can include extending the list of supported content types to include an unstructured keyword, for example, "UNSTRUCTURED." Other aspects can employ alternative keywords without departing from the spirit and scope of the innovation. As well, an aspect can include a mechanism for processing, storing and passing unstructured data to native (built-in) and plug-in algorithms. This includes a mechanism for algorithms to access both the tokenized and raw values of attribute states.

Still further, aspects can include syntax for term extraction during querying using the DMX language. Other aspects can include syntax for performing term extraction and lookup through an SQL UDF (user-defined function) that can then be used within the source query for the input rowset in a DMX prediction join.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
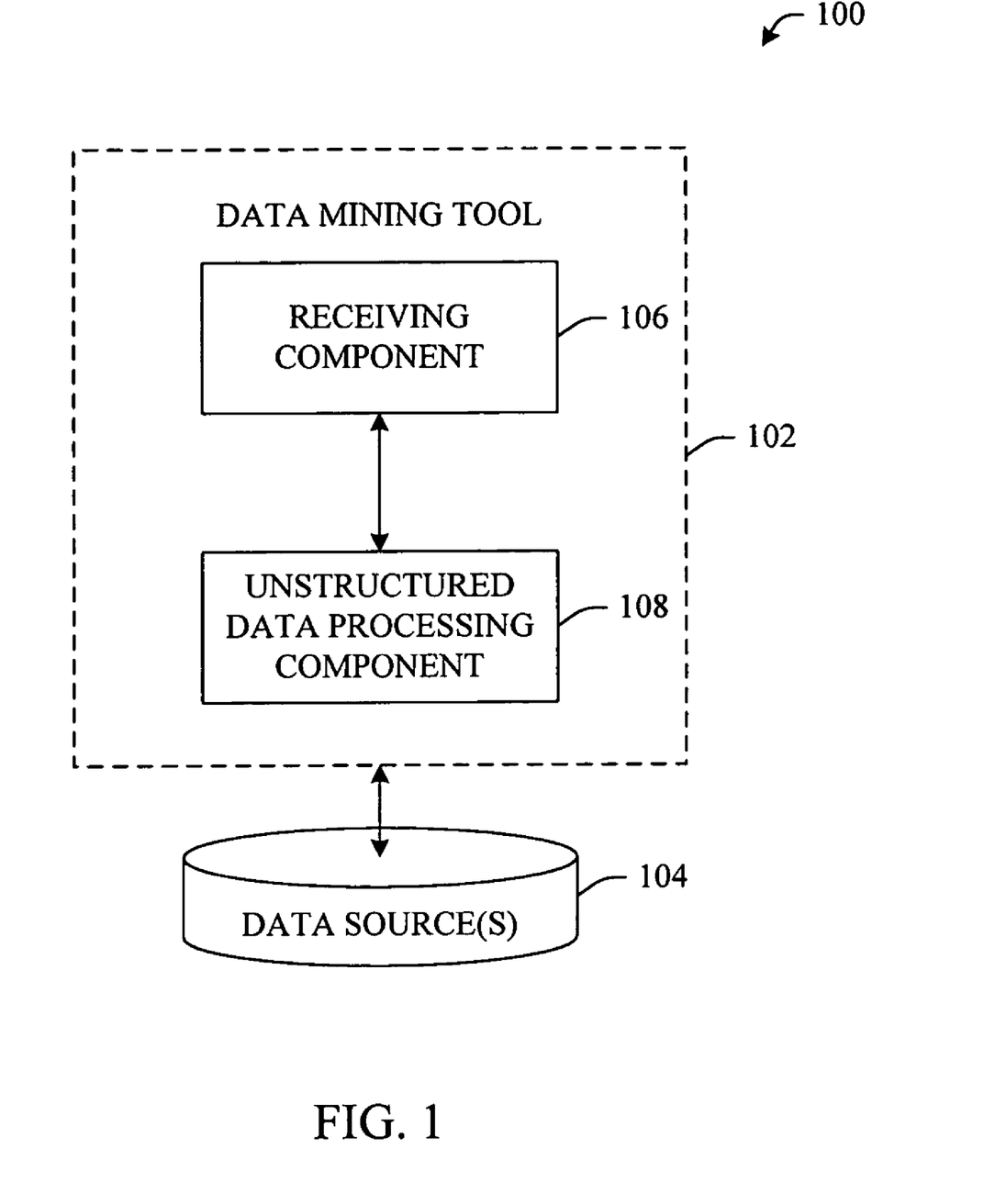
FIG. 1 illustrates a data mining tool that can directly mine unstructured data in accordance with an aspect of innovation.

Referring initially to the drawings, FIG. 1 illustrates a system 100 that facilitates directly mining unstructured data in accordance with an aspect of the innovation. Generally, system 100 can include a data mining tool 102 that can directly mine data maintained within a data source (or group of data sources) 104. As will be understood upon a review of the figures that follow, the novel data mining tool (e.g., engine) 102 can be employed to mine any type of unstructured data including, but not limited to, text documents, web pages, image data, audio data, streaming video, streaming audio, gene sequencing data or the like. Essentially, any unstructured data can be directly mined by the subject novel innovation.

As shown in FIG. 1, the novel data mining tool 102 can include a receiving component 106 and an unstructured data processing component 108. In operation, the receiving component 106 can accept a command or instruction that identifies data as an unstructured type. In a disparate aspect, this command can be received from a user or a computer-implemented component. In one particular example, the novel innovation can expand the data mining extension (DMX) query language (or any other suitable declarative language) to include a type "unstructured" thereby enabling a user to prompt a data mining operation upon unstructured data. It will be understood and appreciated that the DMX query language is a query language related to building, managing and working with data mining models. In other words, DMX can be employed to create the structure of data mining models, train the models as well as to browse, manage and predict against the models. Further, it is to be understood that, although the keyword "unstructured" is used in the examples herein, any keyword designator can be employed to identify unstructured data without departing from the spirit and scope of the subject invention.

In accordance therewith, the unstructured data processing component 108 can be employed to identify key terms or portions of the unstructured data. For example, suppose the unstructured data is a text document, the unstructured data processing component 108 can be employed to locate key terms within the document. Once identified, the unstructured data component 108 can convert the unstructured data into a format consistent with a desired data mining algorithm(s). Moreover, the converted unstructured data can be passed to the data mining model algorithm.

Figure 2:
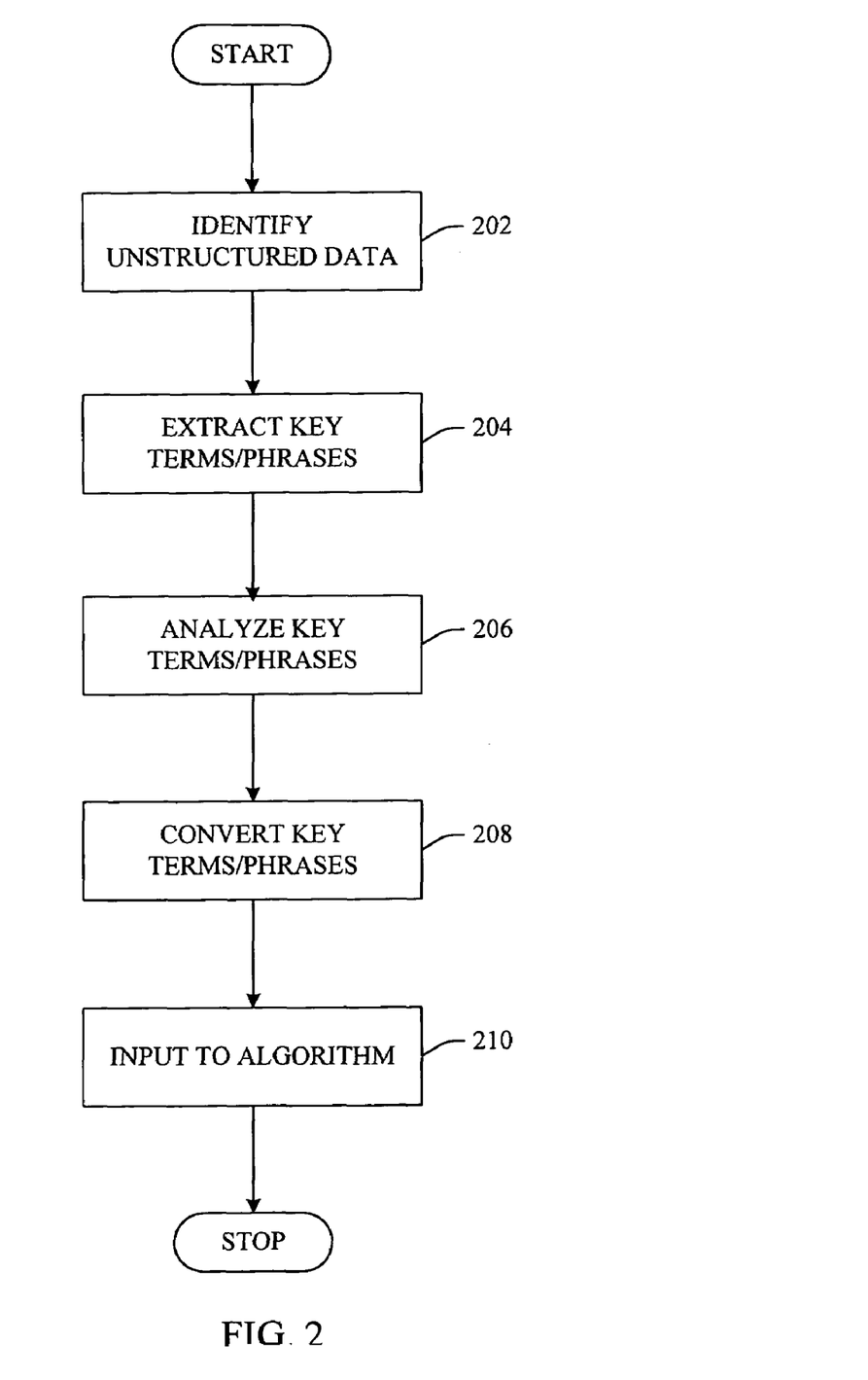
FIG. 2 illustrates an exemplary flow chart of procedures that facilitate direct mining of unstructured data in accordance with an aspect of the innovation.

FIG. 2 illustrates a methodology of directly mining unstructured data in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, the unstructured data can be identified within the declarative language. For example, the conventional DMX language can be expanded to include a data type of "unstructured" whereby a user (or application) can identify data as such. At 204, key terms/phrases (or other portions of data) can be extracted from the unstructured data. These extracted key terms/phrases or other portions thereof can be analyzed at 206.

At 208, the extracted information can be converted into a form recognizable to an appropriate algorithm. For example, the information can be converted into tokens and raw values consistent with a particular modeling algorithm. In accordance therewith, the information can be passed along to the modeling algorithm. Finally, a stop block is reached.

Figure 3:
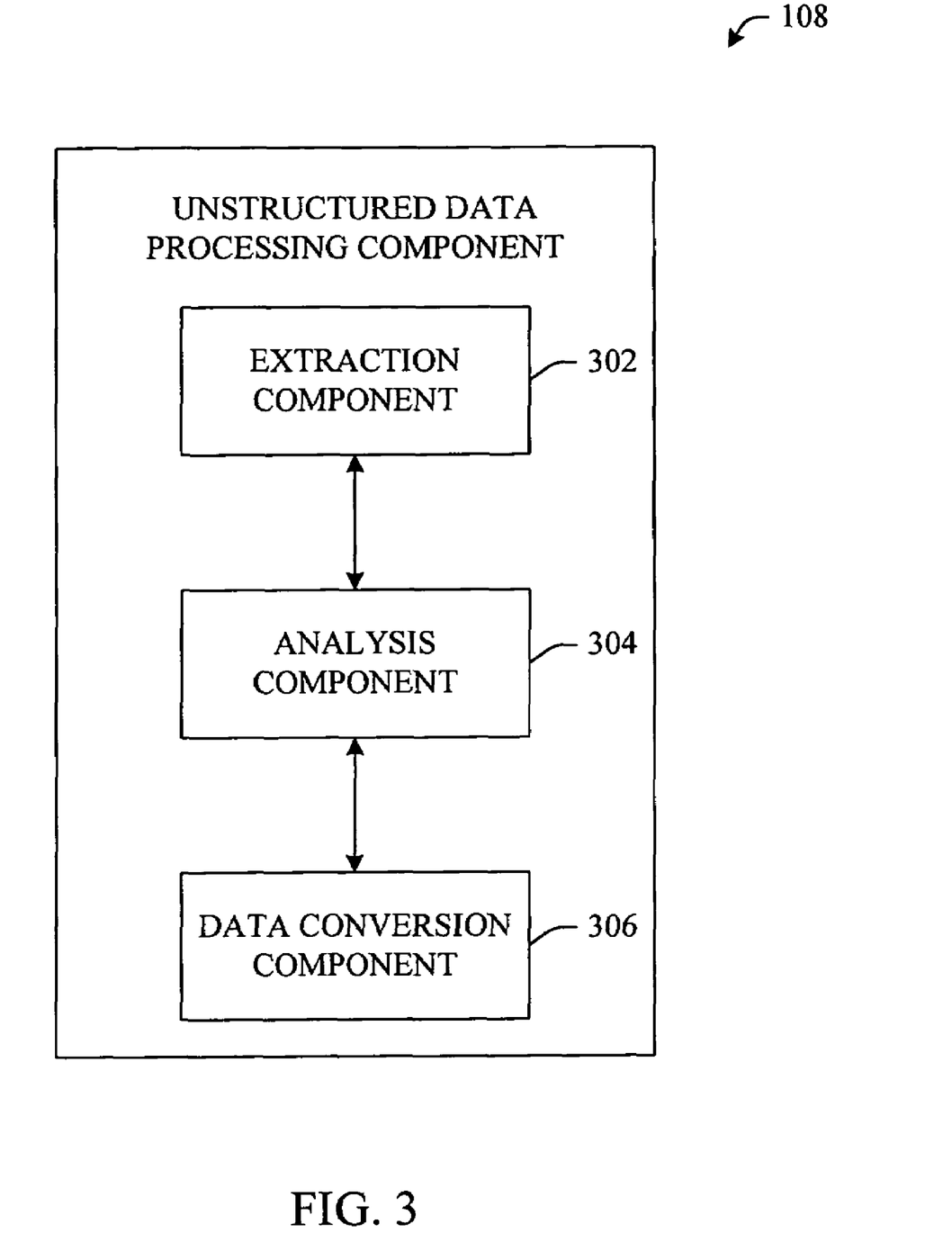
FIG. 3 illustrates a block diagram of an exemplary unstructured data processing component in accordance with an aspect of the innovation.

Turning now to FIG. 3, block diagram of an unstructured data processing component 108 in accordance with an aspect of the innovation is shown. More particularly, the unstructured data processing component 108 includes an extraction component 302, an analysis component 304 and a data conversion component 306. The functionality of each of these components will be described in greater detail infra.

As described above, the extraction component 302 can be employed to extract key terms/phrases from an unstructured text document. In another example, the extraction component 302 can be employed to identify key portions of image data, audio data, video data, gene sequences, etc. In any case, it is to be understood that the extraction component 302 can be employed to locate and extract key elements from within the unstructured data.

Typically in data mining, the way that data mining looks at data is by organizing the data into attributes, for example, discrete or continuous attributes. In most conventional cases, the data is structured data such that the attributes can be easily converted into a numerical value with an associated state. Accordingly, the data mining algorithm can analyze this information.

In contrast with conventional systems, the subject innovation can be employed to directly mine unstructured data. As described above, the innovation can facilitate direct mining of unstructured data including, but not limited to, text documents, video streams, audio streams, gene sequencing data, etc. As will be understood, unstructured data is information without specific definitions with regard to type. It will further be understood that algorithms exist that can determine patterns with regard to these types of data streams. However, the subject innovation can employ the analysis component 304 and the data conversion component 306 to process (or pre-process) the information such that the algorithm(s) can recognize the data. This pre-processing phase can be effectuated directly within the data mining engine (e.g., 102 of FIG. 1).

One novel feature of the subject innovation is that the subject innovation can expand the scope of data mining beyond structured or relational data to include analyzing data and patterns in unstructured data. The following scenario is provided to add context to the innovation and is not intended to limit the innovation in any way. As such, it will be understood that an unlimited number of applications exist where unstructured data can be mined in order to identify patterns within the data. As such, these additional scenarios and application are to be included within the scope of this innovation and claims appended hereto.

Referring now to a specific scenario, the subject innovation can be employed in connection with webpage feedback where users enter unstructured feedback with respect to a web page. As such, it can be desirable to look at the feedback, analyze it and route it to the appropriate people to handle such requests, problems or concerns. In accordance therewith, it is important to extract the key terms and phrases from the document and convert the information into a format that the data mining algorithm will understand. As described with respect to FIG. 3, these actions can be effectuated via the unstructured data processing component 108 and more particularly, via the extraction component 302, the analysis component 304 and the data conversion component 306.

In other words, as described with reference to conventional systems, one phase of dealing with unstructured data is the pre-processing step. It is a novel feature of the subject innovation to directly provide this pre-processing phase within the data mining tool or engine (e.g., unstructured data processing component 108). In other words, in this pre-processing step, the unstructured data can ultimately be converted (via data conversion component 306) into a set of attributes and values that can be recognized by a data mining algorithm. Subsequently, this information can be fed into a data mining algorithm.

Figure 4:
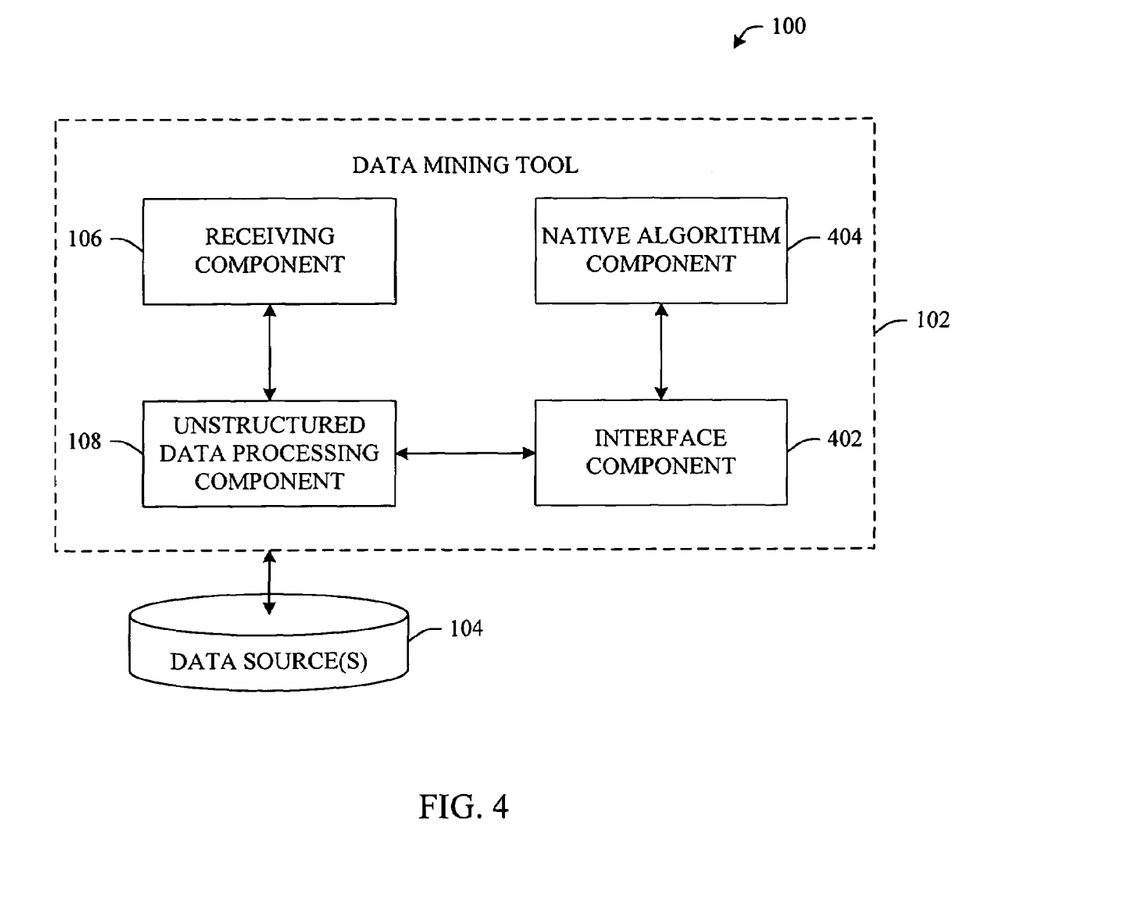
FIG. 4 illustrates an exemplary architectural diagram of a data mining tool that employs a native algorithm in accordance with the generation a data mining model.

Turning now to FIG. 4, an alternative architectural diagram of system 100 is shown in accordance with a disparate aspect of the innovation. More specifically, system 100 illustrated in FIG. 4 includes an interface component 402 that facilitates passing the formatted data to a native (or built-in) algorithm component 404. As described supra, the formatted data is representative of the key portions of the unstructured data that have been converted into a format compatible with native algorithm component 404.

Figure 5:
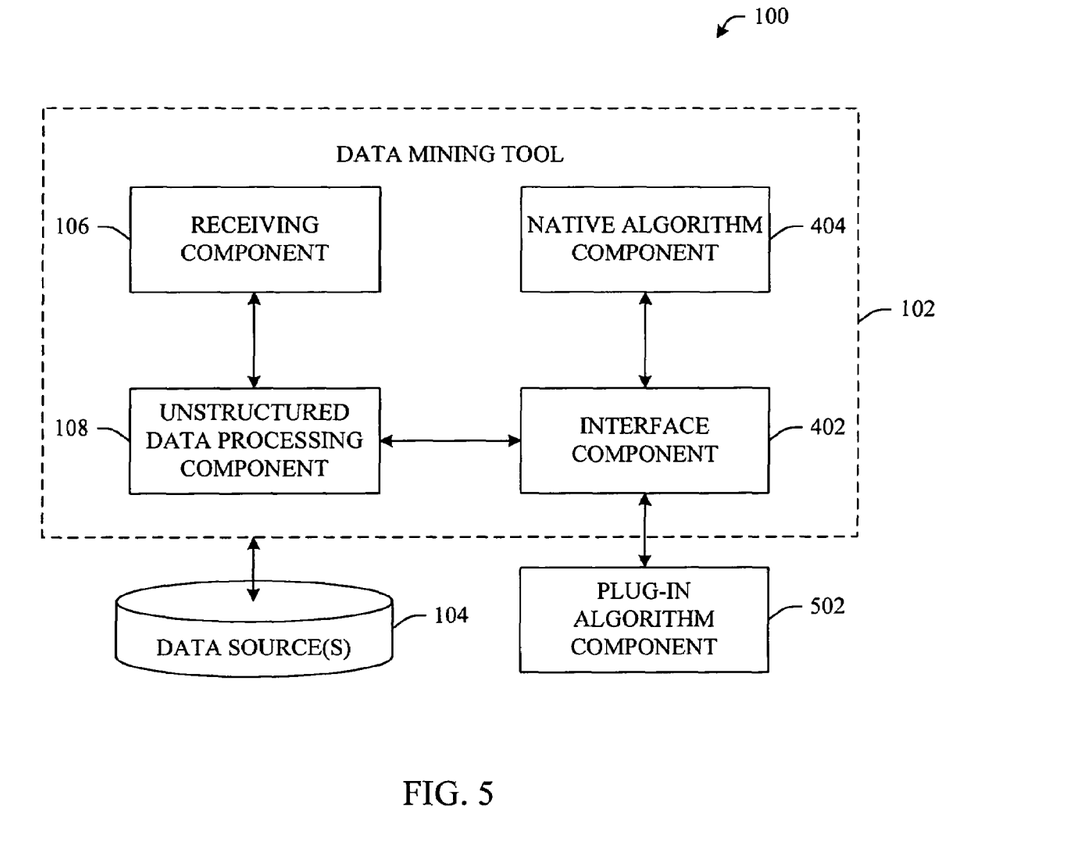
FIG. 5 illustrates an exemplary architectural diagram of a data mining tool that can employ a native and/or a plug-in algorithm in accordance with the generation of a data mining model.

As shown in FIG. 5, it is another novel feature of the innovation to enable the use of remote and/or plug-in algorithm components 502. As shown, the interface component 402 can be employed to pass the formatted data to a plug-in algorithm component 502. This feature can be particularly useful to enable use of and compatibility with third-party algorithms.

All in all, aspects of the subject innovation can enable users to directly mine unstructured data within the data mining tool or engine rather than relying on a pre-processing phase or external components to process and prepare the unstructured data to be used in data mining model generation. In other words, the system 100 can enable a user to mine data regardless of whether the data is structured, unstructured or a combination thereof.

It will be understood that, as part of the definition of the mining model, there can be different columns of data. Accordingly, the content type (e.g., integer, text) can be identified with respect to each column. By way of more specific example, suppose the columns were age and gender, these are the attributes. Age can be identified as content type integer and continuous where gender can be classified as discrete of content type text.

In accordance with the subject innovation, there can be a field that contains the content of the document or a pointer to the document and the type can be designated as "unstructured." This designation can be passed to the receiving component 106 by way of a data declaration language (e.g., DMX). In other words, the user can let the data mining engine 102 know that the field contains unstructured data whereby an appropriate data mining algorithm (404, 502) can be employed to process or mine the data.

More particularly, the acts that make up the pre-processing phase can occur directly within the engine in accordance with the subject innovation. This novel feature can be effected by expanding the data declaration language definitions to include an "unstructured" designation content type.

It is to be understood that the processing of the unstructured data within the data mining engine can occur in a variety of ways. More particularly, any number of algorithms (e.g., native or third-party plug-in) can be employed to process the unstructured data directly within the mining engine or tool. To this end, the innovation can model unstructured data and provide the infrastructure to process the unstructured data thereafter passing the data to an appropriate algorithm inside of the data mining engine.

As described supra, conventionally, there is no mechanism available to employ a third party plug-in algorithm that can process unstructured data. This is mainly because, conventionally, the algorithm is not supported by the engine. In other words, a mechanism does not exist to pass the data to the algorithm directly from within the mining engine.

In summary, the innovation enables users to directly mine unstructured data (including text, image, audio, video, gene sequencing data, etc.) that are not fixed-length, without pre-processing and tokenizing the data outside the data mining engine. As described supra and with continued reference to FIG. 5, in one aspect, the innovation includes data declaration language syntax for building mining models on unstructured data types. In a particular aspect, the syntax can represent an extension to both the DMX language. As well, in an aspect, the XML DDL that can be used for defining data mining objects. Essentially, in an aspect, the syntax extends the list of supported content types to include the keyword "UNSTRUCTURED." This or any other desired keyword can be employed to inform the data mining tool of an unstructured data type.

It will be appreciated that, in accordance with aspects, data can have mixed content types (e.g., structured and unstructured) with respect to the data mining operation. From the language perspective, content type identification can be particularly easy because of the presence of the declarative language content types for identifying what the content actually represents. In addition to the data type (e.g., integer, text), the subject innovation facilitates adding a new content type related to "unstructured" data. As described above, the unstructured data can be some type of stream data, for example, it can be a text document, a video stream, an audio stream, a gene sequence, etc.

As shown in FIG. 5, the data mining tool 102 can include an unstructured data processing component 108 that provides a mechanism for processing, storing and passing unstructured data to native (e.g., built-in) and/or plug-in (e.g., third-party) algorithms. Additionally, the data mining tool 102 can include a mechanism (e.g., interface component 402) that enables algorithms to access both the tokenized and raw values of attribute states.

As described above, the receiving component 106 can receive and/or access a command, or set of commands, written in a declarative data language. This command(s) can employ the expanded data content type "unstructured" to advise the data mining engine 102 of the unstructured data type. As well, the declarative data language (e.g., DMX) can include syntax for term extraction during querying using the DMX language.

As described herein, the subject novel innovation provides a mechanism to read and store unstructured data and a way to pass the data to resident algorithms as well as plug-in algorithms. In accordance therewith, the subject innovation can read data streams and convert them to a standard format that can be understood by an algorithm or group of algorithms. As such, the innovation enables access to the raw value for an attribute state.

Continuing with the aforementioned example, suppose the attribute is gender, the innovation enables this attribute to be conveyed as a zero or a one corresponding to male and female respectively or vice-versa. Currently, there is not a mechanism for algorithms to access raw states. This is particularly useful where the algorithm has to derive semantic information from the raw value of states. Therefore, the subject innovation includes an interface (e.g., 402 of FIG. 4) that enables the algorithms to access these raw values.

Following is an exemplary syntax for evaluating documents and extracting key terms or portions thereof. It is to be understood that, conventionally, this extraction process was previously included in the pre-processing step external to the data mining engine. The subject innovation can build this novel functionality into the language since the raw values and the mechanism(s) are resident within the engine. Therefore, the innovation can expose a mechanism that users can extract these key terms and query upon them from the language.

Below is an exemplary syntax that effects term extraction in accordance with an aspect of the innovation.

```
SELECT Predict(Category) FROM
        DecisionTreesModel PREDICTION JOIN
    TermExtraction(
    OPENROWSET ('...', 'SELECT Id, CallLog FROM SourceTable')
    as CallLog,
    OPENROWSET ('...', 'SELECT * from TermsToInclude'),
    OPENROWSET ('...', 'SELECT * from TermsToExclude'),
    ) As Input
        On DecisionTreesModel.Terms.Keywords =
    Input.CallLog.Terms
```

Similarly, in a disparate aspect, the system can employ particular syntax for performing term extraction and lookup through an SQL UDF (user-defined function). In operation, these terms can be used within a source query for the input rowset in a DMX prediction join, for example,

```
SELECT Predict (Category) FROM
        DecisionTreesModel PREDICTION JOIN
    Shape(
    OpenRowset('...','Select Id, ..'),
    OpenRowset ('...', (TermExtraction('SourceTable, IdColumn,
    TextColumn', ['IncludeTable'], ['ExcludeTable'])) As
    TermTable) as Terms,
    Related Id to Id ) as Input
    On DecisionTreesModel.Terms.Term = Input.Terms.Term
```

Another aspect of the innovation can employ an artificial intelligence (AI) component which facilitates automating one or more features in accordance with the subject innovation. By way of example, the subject innovation (e.g., in connection with identification/extraction of key terms, algorithm selection) can employ various AI-based schemes for carrying out various aspects thereof.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of database systems, for example, attributes can be words or phrases or other data-specific attributes derived from the words (e.g., database tables, the presence of key terms), and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which key terms, phrases or portions of the unstructured data should be identified and/or extracted.

Figure 6:
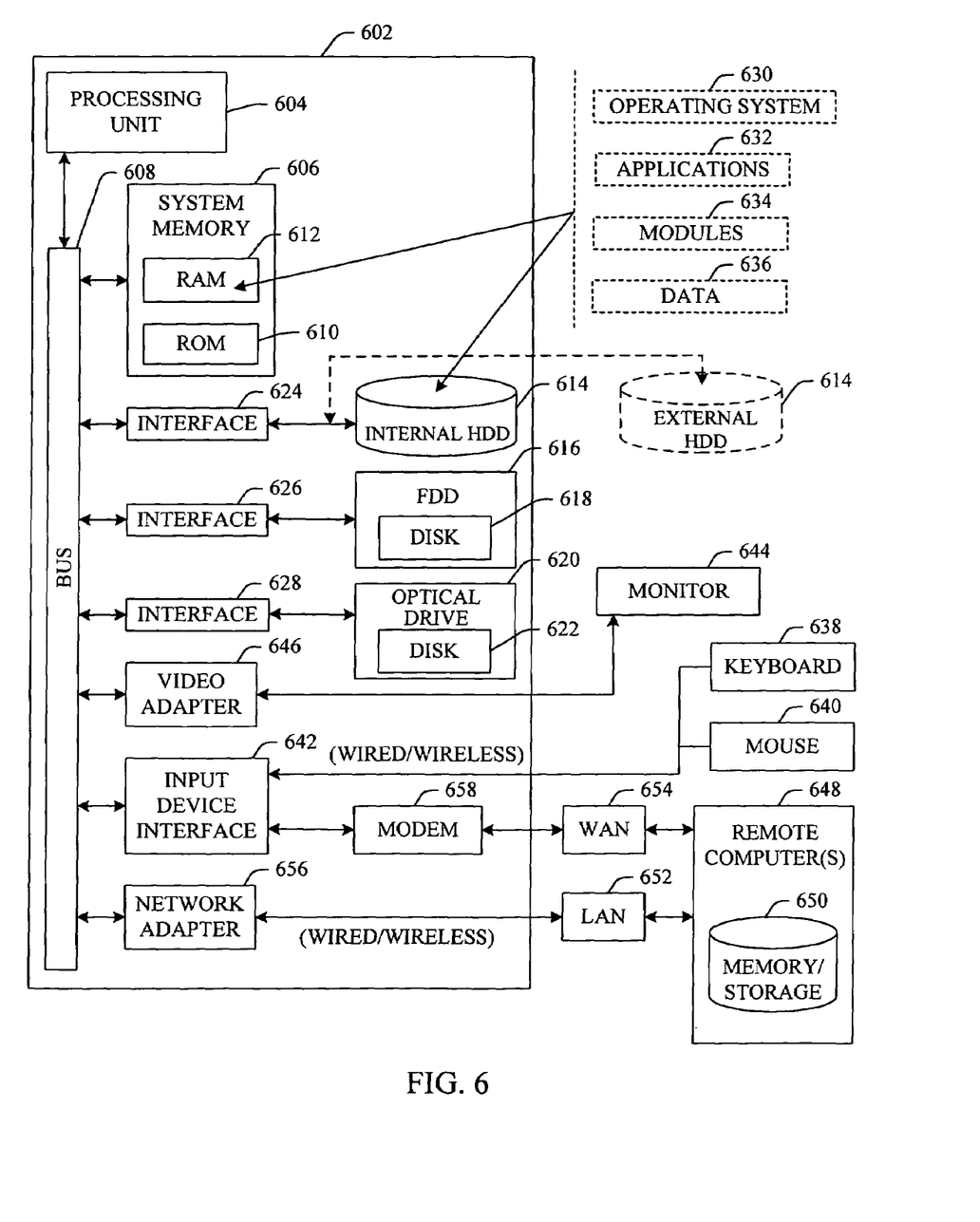
FIG. 6 illustrates a block diagram of a computer operable to execute the disclosed architecture.

Referring now to FIG. 6, there is illustrated a block diagram of a computer operable to execute the disclosed architecture of directly mining unstructured data. In order to provide additional context for various aspects of the subject innovation, FIG. 6 and the following discussion are intended to provide a brief, general description of a suitable computing environment 600 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, the exemplary environment 600 for implementing various aspects of the innovation includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 612, including an operating system 630, one or more application programs 632, other program modules 634 and program data 636. All or portions of the operating system, applications, modules, and/or data can also be cached in the RAM 612. It is appreciated that the innovation can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 through a wired and/or wireless communication network interface or adapter 656. The adapter 656 may facilitate wired or wireless communication to the LAN 652, which may also include a wireless access point disposed thereon for communicating with the wireless adapter 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 7:
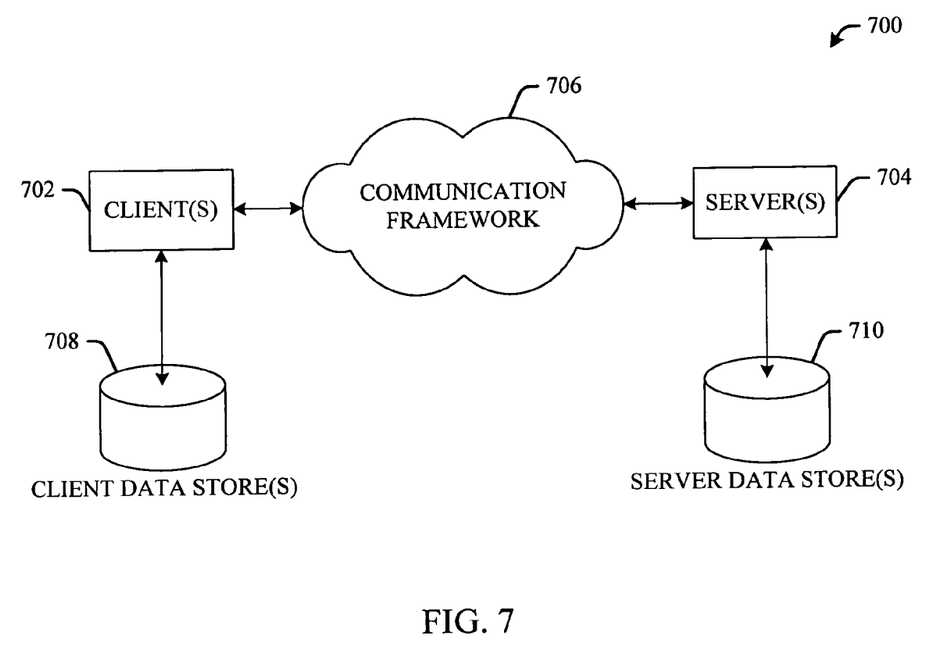
FIG. 7 illustrates a schematic block diagram of an exemplary computing environment in accordance with the subject innovation.

Referring now to FIG. 7, there is illustrated a schematic block diagram of an exemplary computing environment 700 in accordance with the subject innovation. The system 700 includes one or more client(s) 702. The client(s) 702 can be hardware and/or software (e.g., threads, processes, computing devices). The client(s) 702 can house cookie(s) and/or associated contextual information by employing the innovation, for example.

The system 700 also includes one or more server(s) 704. The server(s) 704 can also be hardware and/or software (e.g., threads, processes, computing devices). The servers 704 can house threads to perform transformations by employing the innovation, for example. One possible communication between a client 702 and a server 704 can be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data mining tool that facilitates directly and internally processing unstructured data, comprising:
   a processor coupled to memory that retains:
   a receiving component that receives a command in a declarative language during data mining that identifies a portion of unstructured data stored in a database residing within the data mining tool, the portion of unstructured data is a portion of data without a specific definition in regards to a type related thereto;
   an unstructured data processing component that analyzes the portion of unstructured data to identify at least one of a key term, a key phrase, or a key portion of descriptive data, the unstructured data processing component converts the portion of unstructured data to a format that is compatible with a data mining algorithm based at least in part upon the analysis of the portion of unstructured data;

the unstructured data processing component analyzes and converts the portion of unstructured data during data mining; and the data mining algorithm operates on the converted portion of the unstructured data to enable direct and internal data mining within the unstructured data processing component on at least one of the portion of unstructured data, a portion of structured data, or a combination of the portion of unstructured data and a portion of structured data.

2. The data mining tool of claim 1, the declarative language at least one of a Data Mining Extensions (DMX) and a Structured Query Language (SQL).

3. The data mining tool of claim 1, the unstructured data is at least one of a text document, an audio stream, a video stream and a gene sequence.

4. The data mining tool of claim 1, the unstructured data processing component includes an extraction component that identifies a plurality of key terms from within the portion of unstructured data; the system utilizes the identified plurality of key terms to format the portion of unstructured data during the data mining operation.

5. The data mining tool of claim 1, the data mining tool utilizes a data mining model that includes an unstructured type in addition to one or more types for structured data, the unstructured type includes the identified portion of unstructured data based at least in part upon the analyzed and converted portion of unstructured data, the data mining model handles the portion of unstructured data by defining the portion of unstructured data as the unstructured type within the data mining tool and during data mining.

6. The data mining tool of claim 1, further comprising an interface component that communicates the formatted portion of unstructured data to the data mining algorithm.

7. The data mining tool of claim 6, the data mining algorithm is a native algorithm.

8. The data mining tool of claim 6, the data mining algorithm is a plug-in algorithm.

9. The data mining tool of claim 6, the received command is generated by a user.

10. The data mining tool of claim 6, the received command is generated by a computer-implemented component.

11. The data mining tool of claim 6, further comprising an artificial intelligence (AI) component that employs at least one of a probabilistic or a statistical-based analysis that infers an action that a user desires to be automatically performed based upon user historical data, the action is at least one of a format related to the data mining algorithm in which to format the portion of unstructured data.

12. The data mining tool of claim 6, the command is implemented by way of a data mining object model.

13. A method that facilitates data mining of unstructured data, comprising:

expanding a declarative language to include a data type indicating data is unstructured;

receiving a command in the declarative language that identifies a portion of unstructured data, the portion of unstructured data is a portion of data without a specific definition in regards to a type related thereto;

evaluating the portion of unstructured data during data mining to extract at least one of a key term, a key phrase, or a key portion of descriptive data;

formatting the portion of unstructured data into at least one of a token or a raw value during data mining, the format is based at least in part upon the extraction within a data mining engine;

generating a data mining model that includes an unstructured type in addition to one or more types for structured data, the unstructured type includes the identified portion of unstructured data based at least in part upon the evaluation of the portion of unstructured data;

enabling access to the portion of unstructured data directly within the data mining engine during data mining; and utilizing at least one of the token or the raw value directly with the data mining model for implementation with a data mining algorithm.

14. The method of claim 13, the unstructured data is at least one of text, streaming audio, streaming video and gene sequencing data.

15. The method of claim 13, the declarative language is based at least in part upon one of a Data Mining Extensions (DMX) and a Structured Query Language (SQL).

16. The method of claim 13, further comprising:

extracting a plurality of key portions from the portion of unstructured data;

analyzing the plurality of key portions;

converting a subset of the plurality of key portions into a format compatible to an algorithm associated with the data mining model; and passing the converted plurality of key portions directly to the data mining algorithm.

17. The method of claim 16, the data mining algorithm is a native algorithm.

18. The method of claim 17, the data mining algorithm is a plug-in algorithm.

19. A computer-implemented data mining system that facilitates employing a data mining operation, comprising:

a processor coupled to memory configured to act as:

means for expanding a declarative language to include a data type, where the type indicates data is unstructured;

means for receiving data;

means for identifying a portion of the data as a structured data type;

means for identifying a portion of the data as being unstructured data type and labeling the portion as unstructured data type;

means for extracting at least one of a key term, a key phrase, or a key portion of descriptive data from the portion of data labeled as unstructured data type;

means for creating a data mining model that accommodates an unstructured type in addition to the structured data type;

means for converting the at least one of a key term, a key phrase, or a key portion of descriptive data into a format compatible to the data mining model, the format is at least one of a token or a raw value means for utilizing at least one of the token or the raw value directly with the data mining model for implementation with a data mining algorithm;

means for enabling access to the data labeled as unstructured data type directly within the data mining system; and means for employing data mining on at least one of the portion of data identified as at least one of the structured data type or the unstructured data type.

20. The computer-implemented data mining system of claim 19, further comprising means for employing a data mining algorithm to be plugged-in for implementation with the data mining.

* * * * *